J. H. REIFSNYDER.
AUTOMOBILE BRAKE ATTACHMENT.
APPLICATION FILED NOV. 11, 1907.

935,927.

Patented Oct. 5, 1909.

Inventor
Joseph H. Reifsnyder,

Witnesses
Harry O. Rastetter
Sylvia Borou.

By F. W. Bond
Attorney

UNITED STATES PATENT OFFICE.

JOSEPH H. REIFSNYDER, OF CANTON, OHIO.

AUTOMOBILE-BRAKE ATTACHMENT.

935,927. Specification of Letters Patent. Patented Oct. 5, 1909.

Application filed November 11, 1907. Serial No. 401,596.

*To all whom it may concern:*

Be it known that I, JOSEPH H. REIFSNYDER, a citizen of the United States, residing at Canton, in the county of Stark and State of Ohio, have invented certain new and useful Improvements in Automobile-Brake Attachments; and I do hereby declare that the following is a full, clear, and exact description of the same, reference being had to the annexed drawing, making a part of this specification, and to the figures of reference marked thereon, in which—

Figure 1:
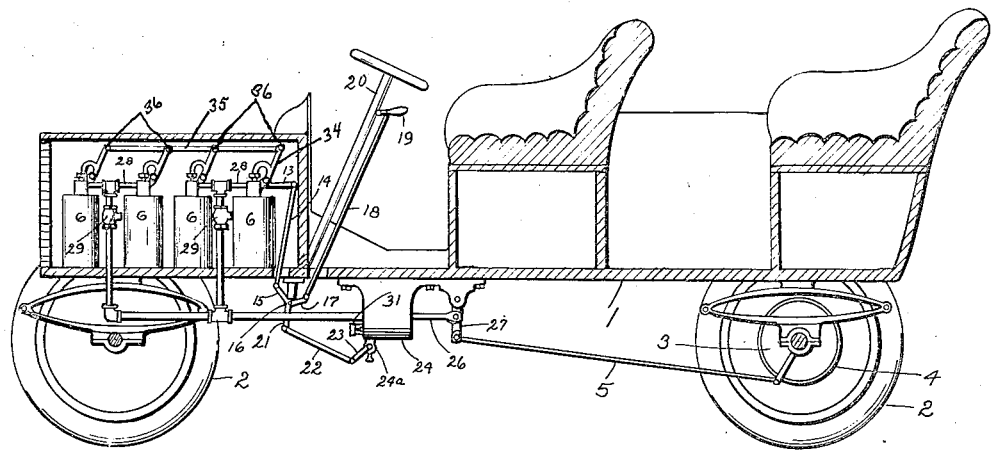
Figure 2:
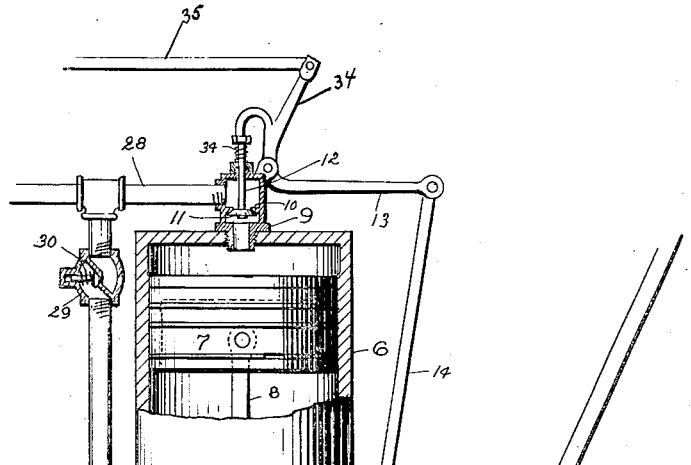
Figure 2:
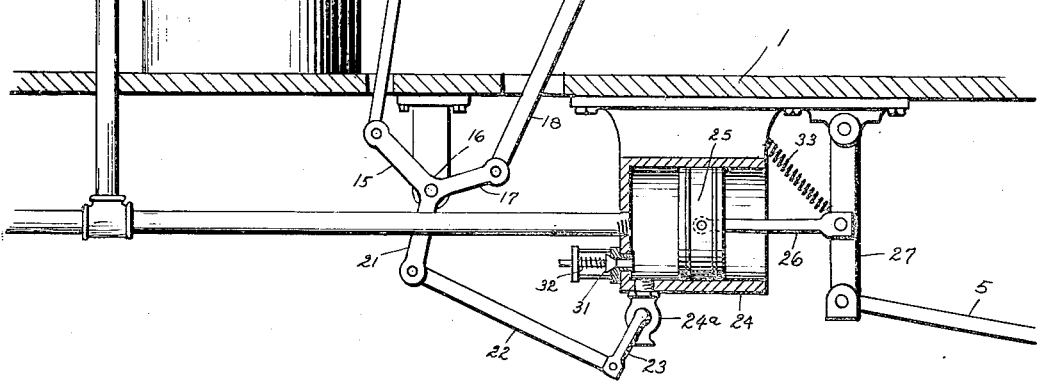

Figure 1 is a vertical longitudinal section showing the brake actuating mechanism. Fig. 2 is a view showing the engine cylinder and piston and the brake piston in proper relative position and the valve actuating mechanism properly connected.

The present invention has relation to improvements in mechanism for actuating brakes as applied to automobiles and it consists in the peculiar arrangement hereinafter described and particularly pointed out in the claims.

Similar numerals of reference indicate corresponding parts in all the figures of the drawings.

In the accompanying drawing, 1 represents an automobile body, which may be of any desired construction in as much as the automobile body has no special reference to the present invention. The body is mounted upon the traveling wheels 2 in the usual manner. Upon the rear axle or its equivalent is mounted the brake drum 3, around which brake drum is located the brake band 4, which brake band is expanded and compressed by the brake rod 5. This construction just above described is common and needs no specific description here as my improvement consists in the manner of operating the brake rod 5.

The engine cylinder 6 or cylinders as the case may be is provided with the usual piston 7, to which is connected the pitman 8, said pitman being connected in the usual manner. The top or upper end or ends of the cylinder 6 are provided with the usual spark plugs and intake and exhaust valves. To the compression chamber or chambers of the cylinder or cylinders 6 is attached the valve casing 9, which is provided with the valve seat 10, upon which seat is normally located the valve 11, to which valve is attached the valve stem 12, said valve stem extending upward and is actuated as hereinafter described by the lever 13. To the lever 13 is pivotally attached the link 14, the opposite end of said link is pivotally attached to the arm 15, which arm is connected to the hub or head 16, from which head extends the arm 17, to which arm is attached the valve operating rod 18, the top or upper end of said rod being pivotally attached to the valve operating lever 19, said lever being pivotally attached to the steering post 20, through which steering post the usual steering rod extends. Below the arms 17 and 15 is located the arm 21 to which arm is connected the link 22, which link is connected to the release operating lever 23. The release valve 24ᵃ is of the usual construction and is opened and closed by the movement of the lever 23.

The brake cylinder 24 is connected to the automobile frame in any common and well known manner, and is provided with the piston 25, which piston is adapted to move back and forth as hereinafter described. To the piston 25 is attached the bar 26, which bar in this instance is attached to the pivoted arm 27, said arm being pivotally attached at its top or upper end to the automobile frame and to the bottom or lower end of said arm is pivotally attached the brake band operating rod 5. From the valve casing 9 leads the pipe 28, which pipe leads from the valve casing 9 to the brake cylinder 24, said pipe may be formed in sections and connected together as shown in Fig. 2 or it may be differently formed as the only object is to provide a passage for the exploded gas from the compression chamber to the brake cylinder 24. Between the valve casing 9 and the brake cylinder 24 and in the pipe 28 connecting said parts together, is located the pressure valve 29, which pressure valve is regulated by the spring 30. The pressure valve 29 is for the purpose of holding the unburned gas in the combustion chamber until the explosion takes place in the combustion chamber it being understood that no action of the valve 29 takes place until the valve 11 is open. When an explosion of the gas takes place providing the valve 11 is open the valve 29 will be automatically opened, allowing the effect of the explosion in the cylinder 6 to act upon the piston 25 to actuate the rod 5 and set the brake. But when the valve 11 is closed no gas is permitted to pass said valve and consequently the action of the engine piston 7 is the same as usual.

The operation of my improved device is as follows: When it is desired to apply the brake the brake lever 19 is moved downward, which downward movement opens the valve 11, by the intermediate connections with said valve, and when the valve 11 is opened the exploded gas will pass the valve 29 and find its way into the brake cylinder and actuate the brake piston 25, which brake piston actuates the brake mechanism intermediate the brake piston and the brake band. When it is desired to release the brake the lever 19 is moved upward which moves by means of the parts connected to said lever, which closes the valve 11 and cuts off the supply of gas to the brake cylinder. For the purpose of preventing an overdue pressure upon the piston 25 the brake cylinder 24 is provided with the relief or safety valve 31, the pressure of said valve being regulated or adjusted by means of the spring 32, said parts being of the usual construction as applied to safety valves and need no specific description here, except that the brake cylinder should be provided with a safety valve such as shown or of some other common kind. In Fig. 1 I have shown a series of valve stems 11 connected together, which valve stems are all operated simultaneously by the action of the single lever 13, but this is simply duplication and I do not desire to be confined to the coupling up of a series of engine cylinders. It will be understood that when the valve 11 is open the valve 24ª should be closed so that there can be no escape of the gas from the brake cylinder 24 thereby applying the force to the piston 25, but when the valve 11 is closed the valve 24ª should be open so as to allow the exploded gas to pass from the brake cylinder and leave the piston free to be moved back into its normal position by means of the spring 33, which spring is connected as shown or it may be differently connected as its only object is to automatically move the piston 25 backward thereby releasing the brake band and bringing the piston into such a position to set the brake band when force is applied to the piston 25. For the purpose of holding the valve 11 at all times upon its seat 10 except when the valve is to be open the spring 34 is provided and is so located that its action will be to hold the valve upon its seat except when the valve rod is actuated by the lever 19. In case it is desired to couple the valve stems 10 together the lever 13 is extended upward from its pivotal point or provided with the arm 34, to which arm is attached the connecting bar 35, which connecting bar is connected to the various arms 36.

Having fully described my invention what I claim as new and desire to secure by Letters Patent, is—

1. In an automobile brake attachment, a motor engine, a brake cylinder spaced from the motor engine, a brake actuating piston located in the brake cylinder, the motor engine and brake cylinder connected together, a pressure valve located intermediate the motor engine and the brake cylinder, a valve adapted to close the passage between the motor engine and brake cylinder, means for actuating the valve and brake mechanism actuated by the brake piston and brake cylinder, substantially as and for the purpose specified.

2. In a brake for automobiles, a motor cylinder, a valve connected to said motor cylinder and communicating therewith, a brake cylinder, a piston adapted to be actuated by a portion of the force actuating the piston in the engine cylinder and brake mechanism actuated by the brake piston, substantially as and for the purpose specified.

3. In a brake for automobiles, a series of motor engine valves connected to said motor, engines, a lever adapted to actuate the valves of the series of engines, a brake cylinder and a piston adapted to be actuated by a portion of the force actuating a series of engines, and means for admitting the gas into the brake cylinder and means for releasing the gas from the brake cylinder, substantially as and for the purpose specified.

4. In a brake for automobiles, an engine cylinder and a piston located therein, a valve connected to the compression chamber of the cylinder, a brake cylinder and a piston located therein, brake mechanism actuated by the piston in the brake cylinder and means for conveying the exploded gas from the compression chamber to the brake cylinder, substantially as and for the purpose specified.

5. In an automobile brake, an engine cylinder and a brake cylinder, pistons located in said cylinders and the cylinders communicating one with the other, a valve connected to the engine cylinder and a valve connected to the brake cylinder and means whereby the valves are operatively connected together, a pressure valve located intermediate the piston cylinder and the brake cylinder, and a release valve connected to the brake cylinder and brake mechanism connected to the piston in the brake cylinder, substantially as and for the purpose specified.

In testimony that I claim the above, I have hereunto subscribed my name in the presence of two witnesses.

JOSEPH H. REIFSNYDER.

Witnesses:
J. A. JEFFERS,
F. W. BOND.